US009049817B2

(12) United States Patent
McCully et al.

(10) Patent No.: US 9,049,817 B2
(45) Date of Patent: Jun. 9, 2015

(54) COMBINE UNLOAD DRIVE CONTROL SYSTEM

(75) Inventors: William Mark McCully, Lancaster, PA (US); Clayton E. Banks, Jr., Brownstown, PA (US); Nathan C. Grotelueschen, Spicer, MN (US)

(73) Assignee: CNH Industrial America LLC, New Holland, PA (US)

( * ) Notice: Subject to any disclaimer, the term of this patent is extended or adjusted under 35 U.S.C. 154(b) by 763 days.

(21) Appl. No.: 13/326,746

(22) Filed: Dec. 15, 2011

(65) Prior Publication Data

US 2013/0158813 A1 Jun. 20, 2013

(51) Int. Cl.
*B60P 1/42* (2006.01)
*A01D 41/12* (2006.01)
*A01D 41/127* (2006.01)

(52) U.S. Cl.
CPC ........ *A01D 41/1217* (2013.01); *A01D 41/1272* (2013.01)

(58) Field of Classification Search
CPC ............... B60P 1/40; B60P 1/36; B60P 1/38; B60P 1/42; A01D 41/1217; A01D 90/10; A01D 61/008; B65F 3/22; B65D 88/72; B65D 88/706; B65D 88/703; B65D 88/70; B65D 88/66; B65D 88/68; B65G 65/44; B65G 65/46; B65G 33/32; B65G 33/24; B65G 33/14; B65G 33/265; B65G 33/18; B65G 33/00; B65G 33/34; B65G 65/466; B65G 41/002; B65G 53/66; B65G 53/28; B65G 53/30; B65G 53/12; B65G 51/34; B65G 51/26; B65G 51/08; B22F 3/105; A01C 7/16; A01C 7/04; A01C 70/081; A01C 7/14; A01C 7/18; A01C 17/00; A01C 3/063; A47G 19/34; B05B 11/0059; B05B 7/1404; B05C 11/10; A22C 21/0053; A23B 4/062; B29C 47/0009; B29C 47/60; B01F 7/02; F23K 3/04; F23K 3/14; B28B 3/22; B29B 7/425; A01K 5/0258; B54G 51/02
USPC ............. 414/519, 520, 526; 701/50; 222/195, 222/196, 271, 279, 328, 413, 626; 198/657, 198/662, 670, 674, 548, 550.6, 550.1; 406/14, 21
See application file for complete search history.

(56) References Cited

U.S. PATENT DOCUMENTS 2,290,460 A * 7/1942 Winsor ......................... 414/519
2,412,121 A   12/1946 Bradshaw (Continued)

FOREIGN PATENT DOCUMENTS

JP   2001161157   6/2001
JP   2003250331   9/2003

*Primary Examiner* — Saul Rodriguez
*Assistant Examiner* — Glenn Myers
(74) *Attorney, Agent, or Firm* — Patrick M. Sheldrake; Seyed V. Sharifi T.

(57) ABSTRACT

A control system for an unload drive system of a combine and a method for controlling an unload drive system of a combine by sensing a force on an unload auger. The combine includes a grain tank for storing grain and at least one auger for unloading grain from the grain tank. The combine includes at least one movable auger cover coupled to the grain tank for controlling the amount of grain to flow into the at least one auger. The control system includes at least one sensor for sensing a force on the unload drive system and a controller for receiving at least one force condition from the at least one sensor representing the sensed force on the unload drive system and causing the at least one movable auger cover to move based on the sensed force condition.

20 Claims, 15 Drawing Sheets

(56) References Cited

U.S. PATENT DOCUMENTS

| | | |
|---|---|---|
| 2,601,608 A | 6/1952 | Hansen |
| 2,751,098 A * | 6/1956 | Reiter .......................... 414/518 |
| RE24,920 E | 1/1961 | Palmer |
| 3,240,366 A | 3/1966 | Sahr |
| 3,265,227 A | 8/1966 | Vratil et al. |
| 3,841,536 A | 10/1974 | Maiste et al. |
| 5,584,640 A | 12/1996 | Johnson |
| 6,042,326 A | 3/2000 | Thomas et al. |
| 6,525,276 B1 * | 2/2003 | Vellidus et al. ............... 177/136 |
| 6,776,569 B1 | 8/2004 | McMahon et al. |
| 7,452,180 B2 | 11/2008 | Talbi et al. |
| 7,862,286 B2 | 1/2011 | Mackin et al. |
| 7,874,899 B2 | 1/2011 | Mackin et al. |
| 8,073,599 B2 * | 12/2011 | Goering et al. ................. 701/50 |
| 2002/0081183 A1 * | 6/2002 | Wilson .......................... 414/526 |
| 2009/0088932 A1 * | 4/2009 | Diekhans et al. ............... 701/50 |
| 2009/0290970 A1 | 11/2009 | Farley et al. |

\* cited by examiner

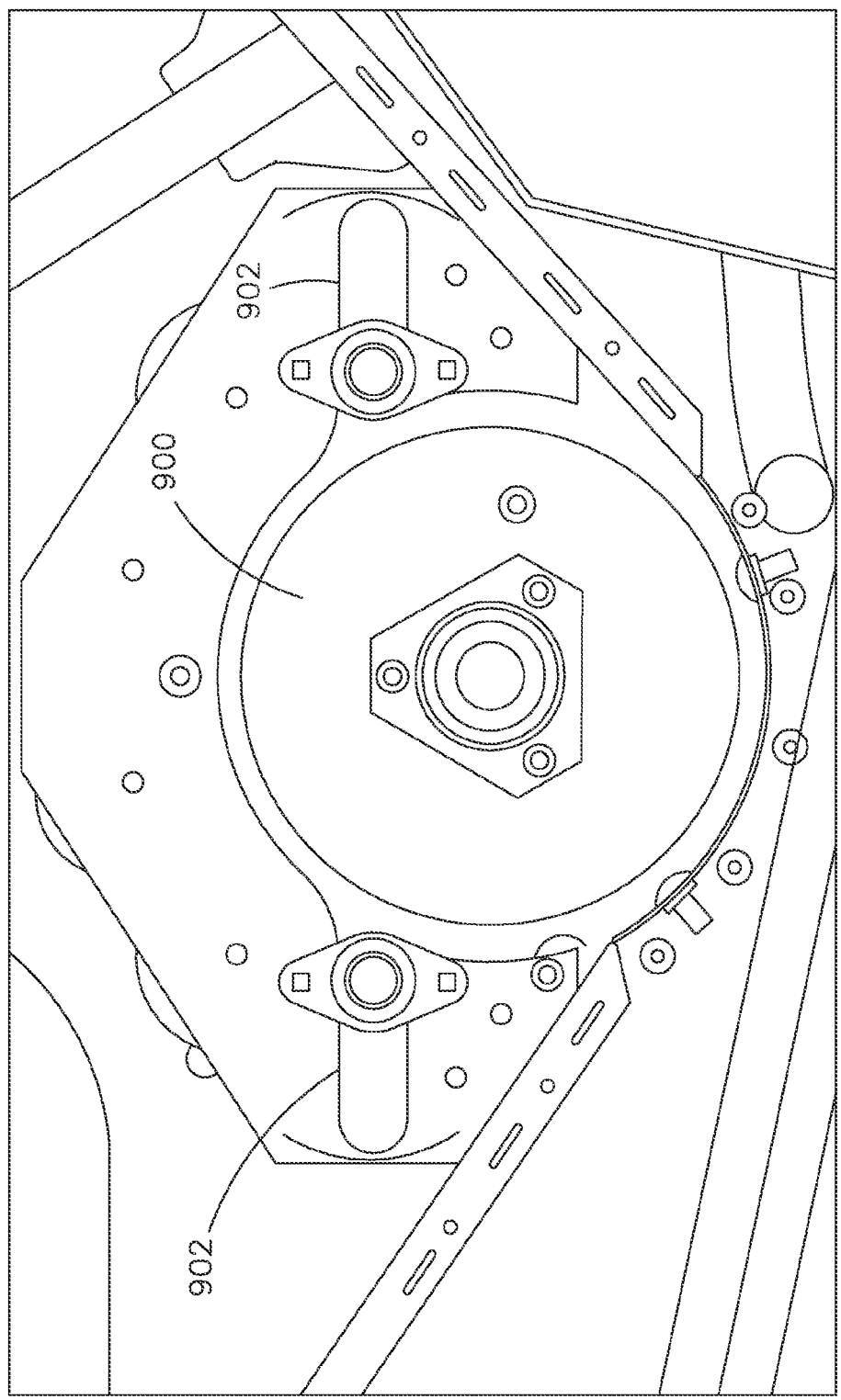

COMBINE UNLOAD DRIVE CONTROL SYSTEM

TECHNOLOGY FIELD

The present invention relates generally to harvesters, such as combine harvesters, and more particularly to methods and systems to control an unload drive system during unloading.

BACKGROUND

A combine harvester is a machine that is used to harvest grain crops. The objective is to complete several processes, which traditionally were distinct, in one pass of the machine over a particular part of the field. Among the grain crops that may be harvested with a combine are wheat, oats, rye, barley, corn, soybeans, flax or linseed, and others. The waste (e.g., material other than grain (MOG)) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the MOG through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material (MOG) are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located in an upper portion of the combine and loaded via a conveyer that carries clean grain collected in the cleaning system to the grain tank.

The conventional grain tank is arranged such that grain conveyed from the cleaning system fills the tank while inclines in the tank floor allow the grain to be gravity-fed into a transversely-oriented cross auger. By virtue of gravity feed and cross auger, grain may be distributed to a single point in the grain tank, such that another conveying system can offload the grain from the grain tank. Offloading the grain is typically implemented in one of either two conveying systems. One type of offload system is a turret style system. The turret style system incorporates a vertical auger within a vertical tube. At the top of the vertical tube, an unload tube, which may include a horizontal auger, connects and pivots coextensive with the vertical tube. A long-top unload tube may be used during the harvest to unload grain to a support trailer or vehicle. The other offload system is a swivel system. The swivel system incorporates an unloading auger attached to the cross auger, angled upward from the vehicle and pivots at the side of the vehicle to offload grain. The grain in a swivel system may too collect in a support trailer or vehicle. Both systems allow large quantities of grain to be offloaded in the field without needing to stop harvesting when the grain tank fills.

SUMMARY

Embodiments of the present invention provide a control system for a combine unload drive system. Embodiments of the present invention utilize sensors for sensing forces on the unload drive system and a controller which causes movable auger covers to move based on the sensed forces.

Embodiments of the present invention are directed to a combine unload drive control system that includes a grain tank for storing grain and at least one auger for unloading grain from the grain tank. The control system also includes at least one movable auger cover coupled to the grain tank for controlling the amount of grain to flow into the at least one auger and at least one sensor for sensing a force on the at least one auger. The control system further includes a controller for (i) receiving at least one force condition from the at least one sensor representing the sensed force on the at least one auger and (ii) causing the at least one movable auger cover to move based on the received force condition.

According to one embodiment of the invention, the control system further includes an unload chain drive coupled to the at least one auger by a sprocket along a first portion of the unload chain drive. The at least one sensor senses a force on the at least one auger through the sprocket, and the at least one force condition received by the controller represents the sensed force on the at least one auger through the sprocket.

According to an aspect of one embodiment, the control system further includes a load bar having a first end rigidly attached to the grain tank frame and a second end rotatably connected to the unload chain drive. The at least one sensor is connected to the load bar for sensing the force on the at least one auger through the sprocket.

According to one embodiment of the invention, the at least one auger includes a first grain tank auger and a second grain tank auger and the control system further includes an unload chain drive coupled to (i) the first grain tank auger by a first sprocket along a first portion of the unload chain drive and (ii) the second grain tank auger by a second sprocket along a second portion of the unload chain drive. The at least one sensor includes a first sensor which senses a first and second grain tank auger force on the first grain tank auger through the first sprocket and the second grain tank auger through the second sprocket. The at least one force condition received by the controller represents the combined sensed force on the first grain tank auger through the first sprocket and second grain tank auger through the second sprocket.

According to an aspect of one embodiment, the at least one auger further includes an unload conveying auger for conveying the grain from the first and second grain tank augers through an unload conveyer. The first sensor senses a combined force on the first grain tank auger through the first sprocket, the second grain tank auger through the second sprocket, and the unload conveying auger through a third sprocket. The at least one force condition received by the controller represents the combined sensed force on the first grain tank auger through the first sprocket, the second grain tank auger through the second sprocket, and the unload conveying auger through the third sprocket.

According to an aspect of one embodiment, the at least one auger further includes an unload conveying auger for conveying the grain from the first and second grain tank augers through an unload conveyer. The at least one sensor further comprises a second sensor for sensing a combined force on the first grain tank auger through the first sprocket, the second grain tank auger through the second sprocket and an unload conveying auger through the third sprocket. The at least one force condition received by the controller includes (i) a first and second grain tank auger force condition representing the combined sensed force on the first grain tank auger through the first sprocket and second grain tank auger through the second sprocket and (ii) a combined force condition representing the combined sensed force on the first grain tank auger through the first sprocket, the second grain tank auger through the second sprocket and an unload conveying auger through the third sprocket.

According to one embodiment of the invention, the at least one auger includes a first grain tank auger and a second grain tank auger. The control system also includes an unload conveying auger for conveying the grain from the first and second grain tank augers through an unload conveyer and an unload chain drive coupled to (i) the first grain tank auger by a first sprocket along a first portion of the unload chain drive, (ii) the second grain tank auger by a second sprocket along a second portion of the unload chain drive, and (iii) the unload conveying auger by a third sprocket along a third portion of the unload chain drive. The at least one sensor includes a first sensor for sensing a first force on the first grain tank auger through the first sprocket, the second grain tank auger through the second sprocket and the unload conveying auger through the third sprocket. The at least one sensor also includes a second sensor for sensing a second force on both the first grain tank auger through the first sprocket and the second grain tank auger through the second sprocket. The at least one sensor further includes a third sensor for sensing a third force on the first grain tank auger through the first sprocket. The at least one force condition received by the controller includes a first force condition representing the sensed first force, a second force condition representing the sensed second force, and a third force condition representing the sensed third force.

Embodiments of the present invention are also directed to a control system for a combine unload drive system that includes a grain tank for storing grain and at least one auger for unloading grain from the grain tank. The control system also includes at least one movable auger cover coupled to the grain tank for controlling the amount of grain to flow into the at least one auger and at least one sensor for sensing a force on the unload drive system. The control system further includes a controller for (i) receiving at least one force condition from the at least one sensor representing the sensed force on the unload drive system and (ii) causing the at least one movable auger cover to move based on the force condition.

According to one embodiment of the invention, the at least one auger includes a first grain tank auger and the at least one sensor senses a force on the first grain tank auger. The at least one force condition received by the controller represents the sensed force on the first grain tank auger.

According to an aspect of one embodiment, the controller causes one of the at least one movable auger covers to move if the at least one force condition representing the sensed force on the first grain tank auger exceeds a predetermined force threshold.

According to one embodiment of the invention, the at least one auger includes a first grain tank auger and a second grain tank auger. The at least one sensor includes a first sensor which senses a first and second grain tank auger force on both the first and second grain tank augers and the at least one force condition received by the controller represents the sensed force on both the first and second grain tank augers.

According to an aspect of one embodiment, the at least one auger further includes an unload conveying auger for conveying the grain from the first and second grain tank augers through an unload conveyer. The first sensor senses a combined force on the first grain tank auger, the second grain tank auger and the unload conveying auger. The at least one force condition received by the controller represents the combined sensed force on the first grain tank auger, the second grain tank auger and the unload conveying auger.

According to an aspect of one embodiment, the at least one auger further includes an unload conveying auger for conveying the grain from the first and second grain tank augers through an unload conveyer. The at least one sensor further includes a second sensor for sensing a combined force on the first grain tank auger, the second grain tank auger and the unload conveying auger. The at least one force condition received by the controller includes (i) a first and second grain tank auger force condition representing the combined sensed force on the first and second grain tank augers; and (ii) a combined force condition on the first grain tank auger, the second grain tank auger and the unload conveying auger.

According to one embodiment of the invention, the at least one auger includes a first grain tank auger, a second grain tank auger, and an unload conveying auger for conveying the grain from the first and second grain tank augers through an unload conveyer. The at least one sensor includes a first sensor for sensing a first force on the first grain tank auger, the second grain tank auger and the unload conveying auger, a second sensor for sensing a second force on both the first grain tank auger and the second grain tank auger and a third sensor for sensing a third force on one of the first and second grain tank augers. The at least one force condition received by the controller includes a first force condition representing the sensed first force, a second force condition representing the sensed second force and a third force condition representing the sensed third force.

According to an aspect of one embodiment, the controller causes one of the at least one movable auger covers to move if at least one of the at least one force conditions exceed a predetermined force threshold.

According to an aspect of one embodiment, the at least one movable auger cover includes an end pivotably mounted to the at least one auger.

According to one embodiment of the invention, the control system further includes at least one sensor for sensing an unload condition. The unload condition includes at least one of a combine engine torque condition, a grain cart level condition, a combine grain tank level condition, an unload conveyer location condition, a grain cart location condition, an unload drive system operation condition, and a grain cart weight and duration condition. The controller causes the at least one movable auger cover to move based on the at least one unload condition.

Embodiments of the present invention are also directed to a method for controlling an unload drive system in a combine. The method includes storing grain in a grain tank and unloading grain from the grain tank in at least one auger. The method also includes controlling the amount of grain to flow into the at least one auger with at least one movable auger cover coupled to the grain tank and sensing a force on the at least one auger with at least one sensor. The method further includes receiving at least one force condition representing the sensed force on the at least one auger from the at least one sensor and causing the at least one movable auger cover to move based on the force condition.

According to one embodiment of the invention, sensing a force on the at least one auger includes sensing a force on the at least one auger through a sprocket coupled to an unload chain drive.

According to one embodiment of the invention, causing the at least one movable auger cover to move based on the force condition includes causing the at least one movable auger cover to move if the force condition exceeds a predetermined force threshold.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 9A through FIG. 9C illustrate an exemplary embodiment of the invention showing grain tank auger covers at closed, half open and fully open stages;

DETAILED DESCRIPTION OF ILLUSTRATED EMBODIMENTS

In some harvests, the combine harvester will harvest grain with a support trailer, truck, or grain cart which may be driven alongside. Because the typical grain tank is small compared to the size of the harvest, grain that collects temporarily in the grain tank must be conveyed or unloaded to the supporting truck or trailer. The grain tank may not completely empty, however, when the unloading system is turned off. That is, the augers may be full, or partially full of grain when the unloading system is turned off, resulting in a number of shortcomings.

For example, system structural stress may occur when the weight of the grain makes the unload conveying auger heavier during the traversing of rough terrain. Grain dribble may occur at the discharge end of the unload conveying auger when the unload conveying auger is substantially full. A torque demand spikes exists on the drive system of the augers when augers are started from rest against a large inertial load, resulting in shear bolt failures. Problems may arise with current unloading systems because of the non-optimal size of the orifice that the grain drains through as it exits the grain tank. For example, some grains tend to be non-free flowing, resulting in bridging of the grain. Bridged grain remains in the tank and needs to be manually removed.

A control system for a combine unload drive system and a method for controlling a combine unload drive system is needed to address these shortcomings. The present invention is directed to embodiments of a control system for a combine unload drive system and a method for controlling a combine unload drive system. Embodiments of the present invention utilize sensors for sensing forces on the unload drive system and a controller which receives force conditions from the sensor representing the sensed forces on the unload drive system and causes movable auger covers to move based on the force conditions.

Figure 1:
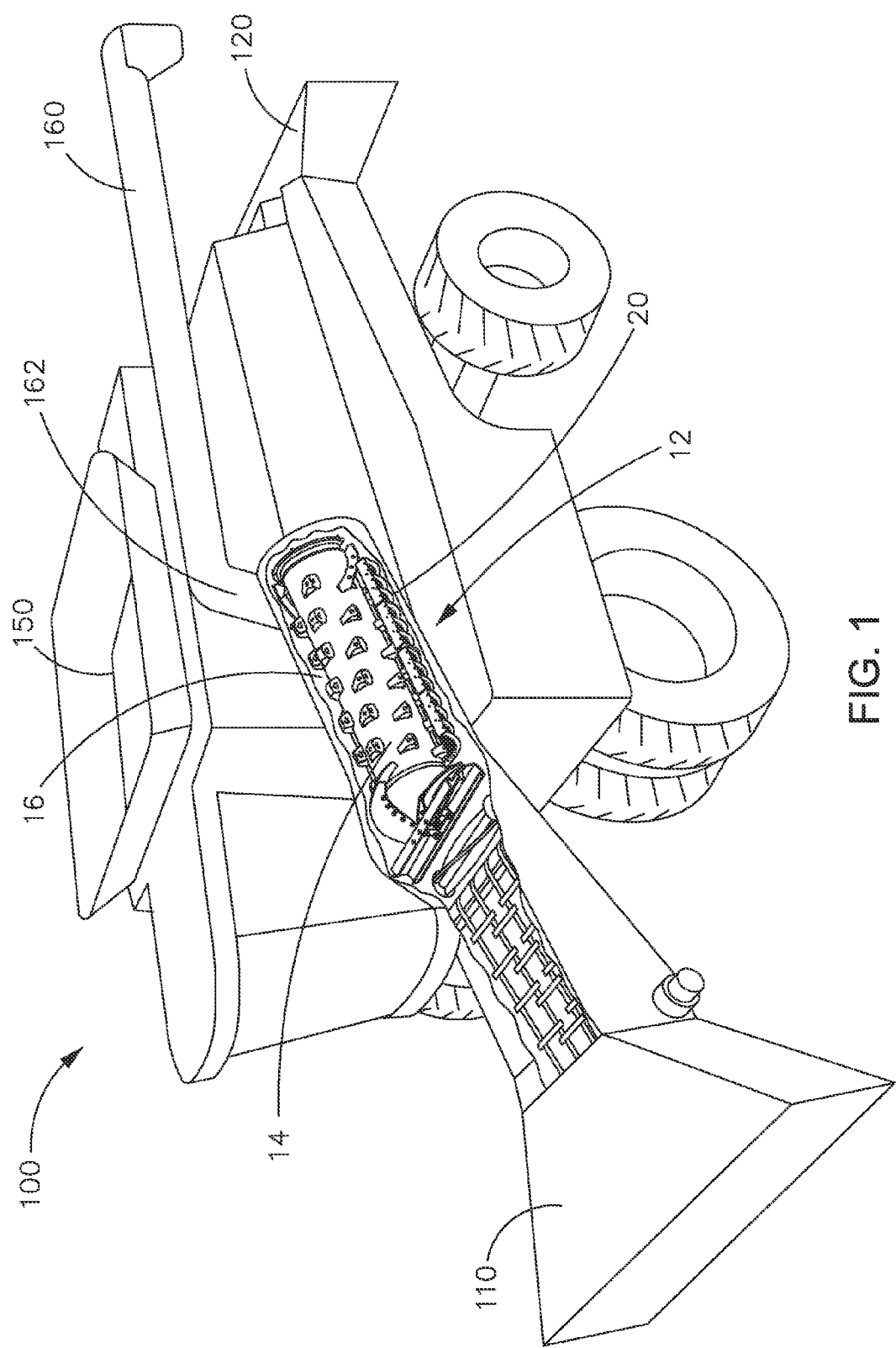
FIG. 1 illustrates a perspective view of an exemplary combine for use with embodiments of the present invention.
Figure 2:
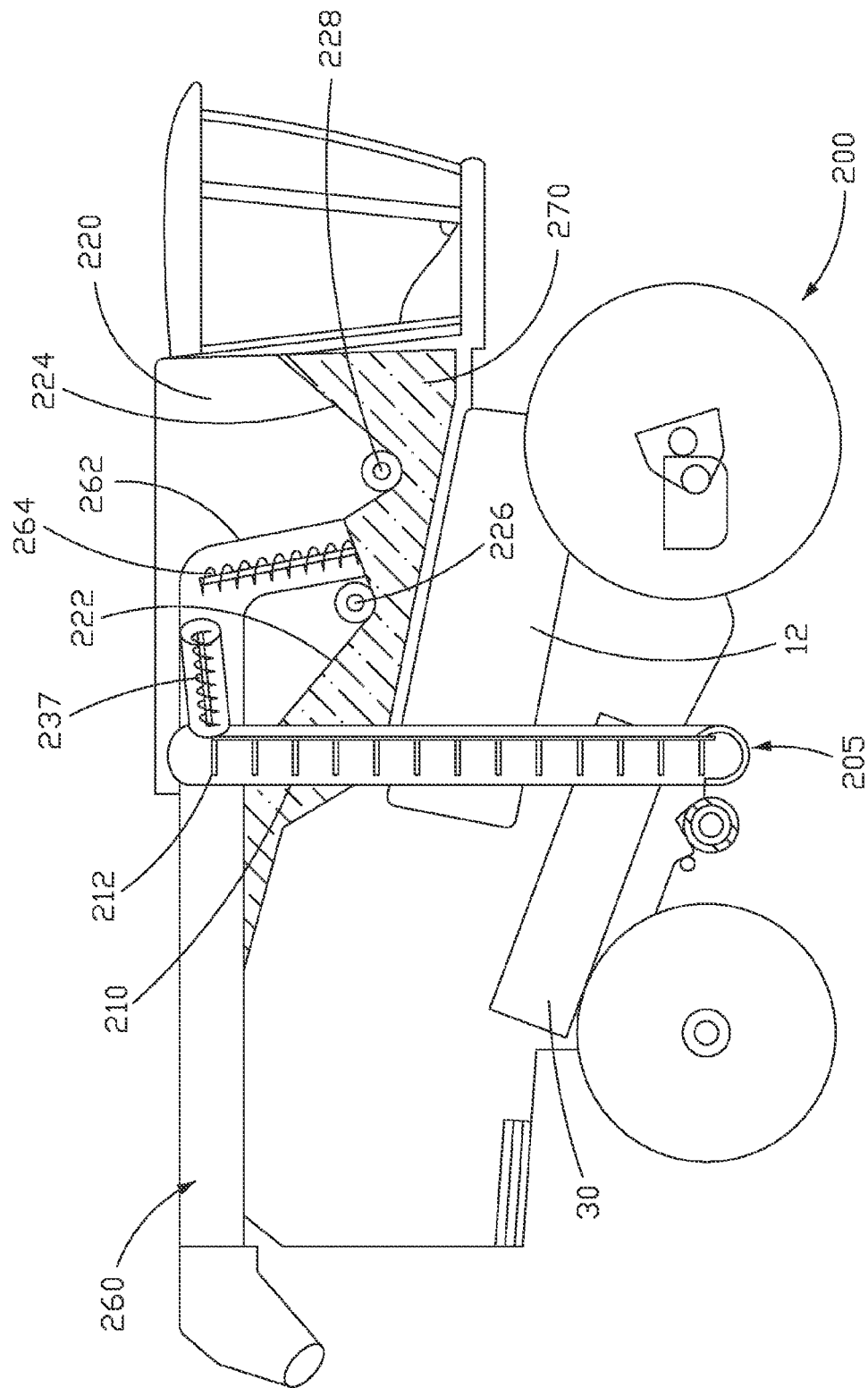
FIG. 2 illustrates a side view of an exemplary combine for use with embodiments of the present invention.
Figure 3:
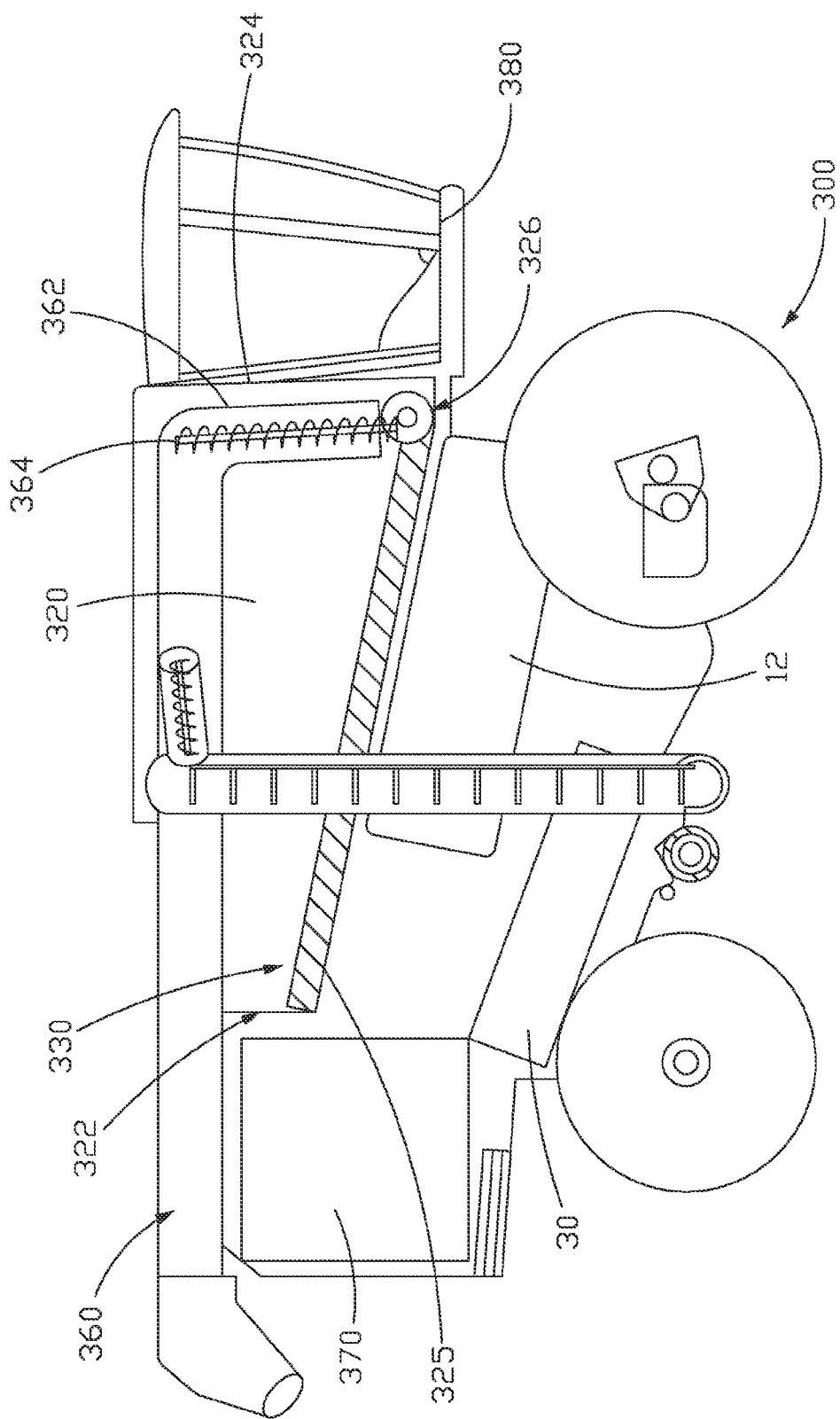
FIG. 3 illustrates a side view of another exemplary combine for use with embodiments of the present invention.

FIG. 1 through FIG. 3 shows exemplary agricultural combines in which exemplary embodiments of the present invention may be implemented. FIG. 1 shows an exemplary agricultural combine 100, which may also be referred as a combine or harvester throughout this specification. As shown in FIG. 1, the combine 100 can include header 110, a longitudinally axially arranged threshing and separation system 12, and a concave 20 within the threshing and separation system 12. The threshing mechanism may also be of any well known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well known conventional manner. Crop residue can be redistributed to the field via a spreader 120, located at the back of the harvester.

The remaining threshed crop, which includes the grain to be collected, is then cleaned via a cleaning system shown at FIG. 1 through FIG. 3. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160 representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unload conveying auger that is attached to the one or more cross augers conveying grain from the cleaning system and may pivot from side to side from the combine 100, conveying grain from the combine 100.

FIG. 2 shows a transparent cross-sectional view of an exemplary agricultural combine 200 having a grain tank 220. Crop is threshed via threshing system 12. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212, wherein the paddles are uniformly spaced along the chain to lift grain, conveys the grain upward to a dispenser auger 237 that discharges the grain into the grain tank 220. In other arrangements, the grain is lifted from the paddle chain lift 212 and then flipped at the top of the elevator to a sump, containing a bubble-up auger. The bubble-up auger transports grain from the sides of the grain tank 220 to the top center of the tank where the grain is discharged in the center of the tank 220 to naturally form a cone-shape pile, wherein the angles of the sides of the cone equal the angle of repose of the grain. Other arrangements implement other auger assemblies to either distribute the grain evenly along the bottom of the grain tank 220 or centrally in the middle of the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Grain tank cross augers 226 and 228 convey the accumulated grain laterally so that it may be collected into vertical tube 262 which includes a unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3 shows an exemplary agricultural combine 300 having an engine 370, cab 380 a grain tank 320. Grain tank 320 includes vertical side walls 322 and 324 and generally flat bottom 325. Along the bottom 325 of grain tank 320, a conveying system 330 is placed. Bottom 325 includes an active conveying system 330 such that grain tank 320 need not rely on gravity to feed grain into the cross auger. Conveying system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown).

Figure 4:
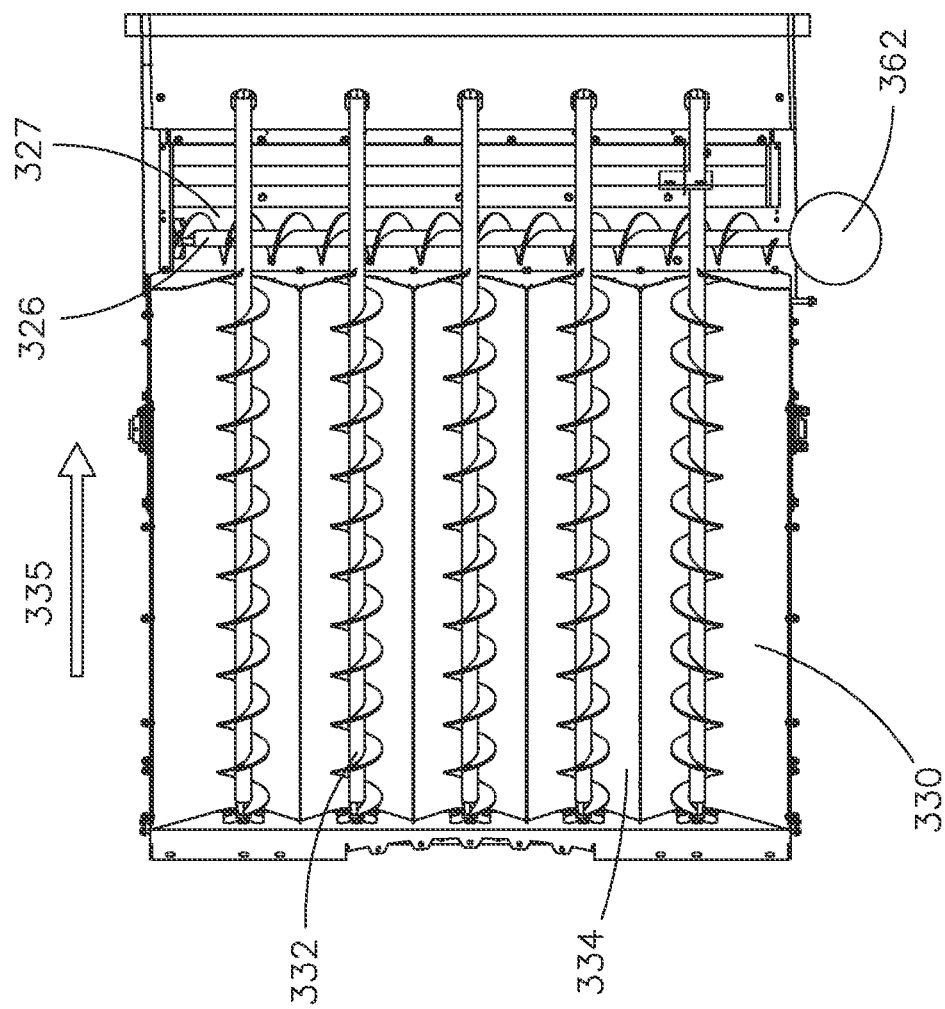
FIG. 4 illustrates a top view of an exemplary grain tank for use with embodiments of the present invention.

FIG. 4 is a top view of the exemplary conveyor system 330, shown at FIG. 3, in which exemplary embodiments of the present invention may be implemented. This embodiment of conveyor system 330 comprises an auger bed. Grain tank augers 332 sit in troughs 334 and rotate to convey grain in direction 335. When grain reaches grain tank cross auger 326, grain tank cross auger 326 conveys the grain in a transverse direction so that it may be conveyed to a vertical tube 362. As shown, grain tank cross auger 326 rests in trough 327.

In some embodiments of the present invention, some grain tank augers 332 in auger bed rotate in one direction, while other augers rotate in another. In some embodiments, some of the grain tank augers 332 in the auger bed may rotate more or less rapidly than other augers 332 in the auger bed. In other embodiments, some grain tank augers 332 vary in size, pitch, or diameter from other grain tank augers 332 in the auger bed. In other embodiments, some grain tank augers 332 may rotate while other augers are turned off.

Traditionally, grain is conveyed in direction 335, left to right which is from the rear of the combine to the front of the combine. In some embodiments, the grain may be conveyed in a right to left direction. In other embodiments, grain may be conveyed from an outside to center direction, if for instance the grain tank cross auger 326 and vertical tube 362 were more centrally located in the conveyor system 330 or depending on other design considerations in locating the grain tank cross auger 326 and vertical tube 362. Location of the grain tank cross auger 326 or vertical tube 362 may necessitate the location of grain tank augers 332 in the auger bed, the on and off sequencing of the grain tank augers 332, and/or the rotational speed, size, pitch, or diameter of the grain tank augers 332 to effectuate conveyance of grain through the conveyor system 330. Augers 332 and 326 may be driven by a conventional manner known to a person of ordinary skill or, such as motors, gears, belts, chains, direct mechanical drives, and the like.

Figure 5:
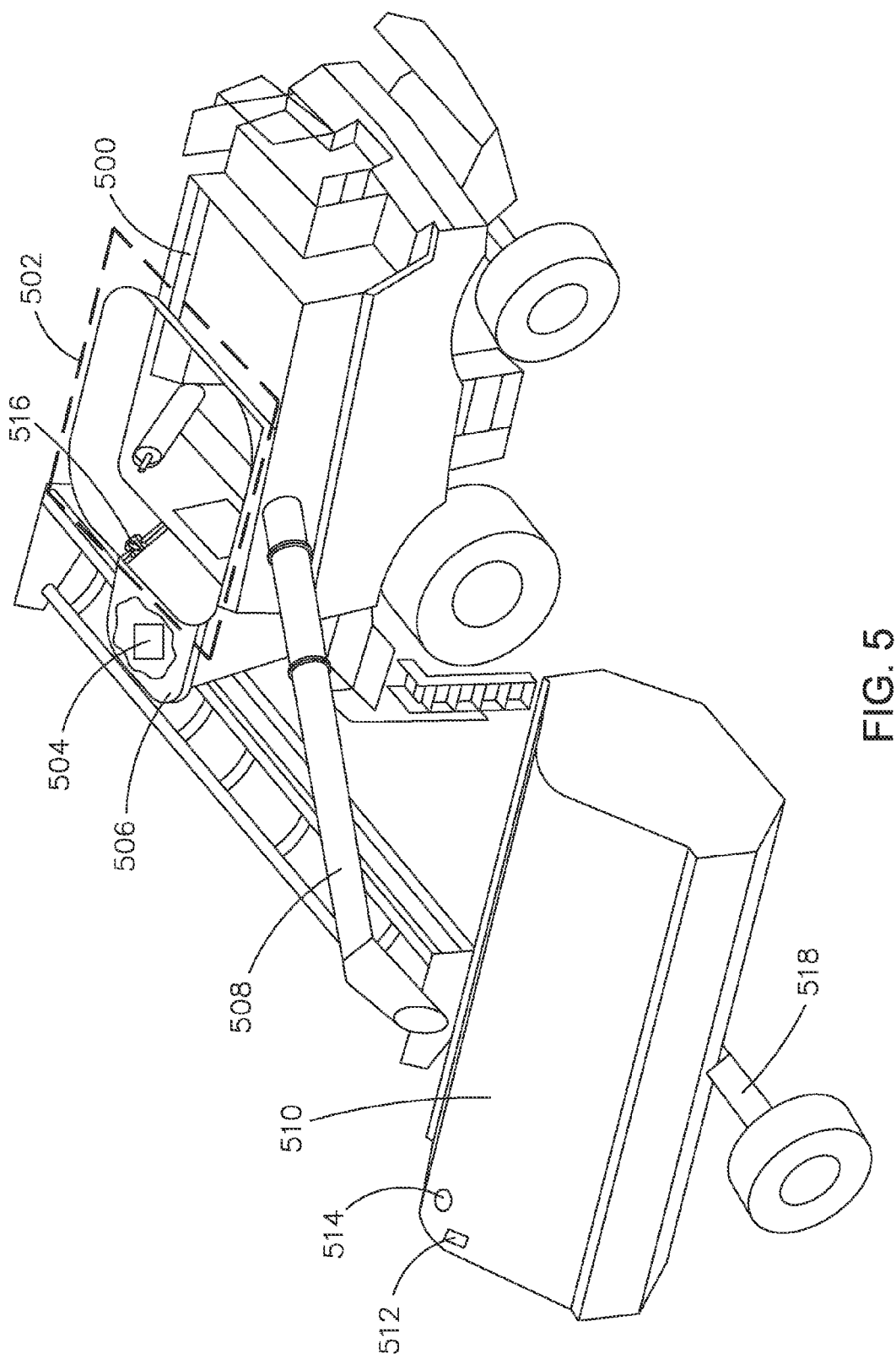
FIG. 5 illustrates a perspective view of an exemplary combine and grain cart for use with embodiments of the present invention.

FIG. 5 illustrates a perspective view of an exemplary combine and grain cart for use with embodiments of the present invention. As shown at FIG. 5, combine 500 includes grain tank 502 for storing grain and unload tube 508 for carrying grain from grain tank 502 to grain cart 510. Combine 500 includes a controller 504 in cab 506 and transceiver 516. Grain cart 510 may also include a transceiver 514 for communicating with combine transceiver 516, cart bin level sensor 512 and load cell sensor 518. In some embodiments, exemplary controllers may be placed at different locations within the cab or other locations on the combine.

Figure 6:
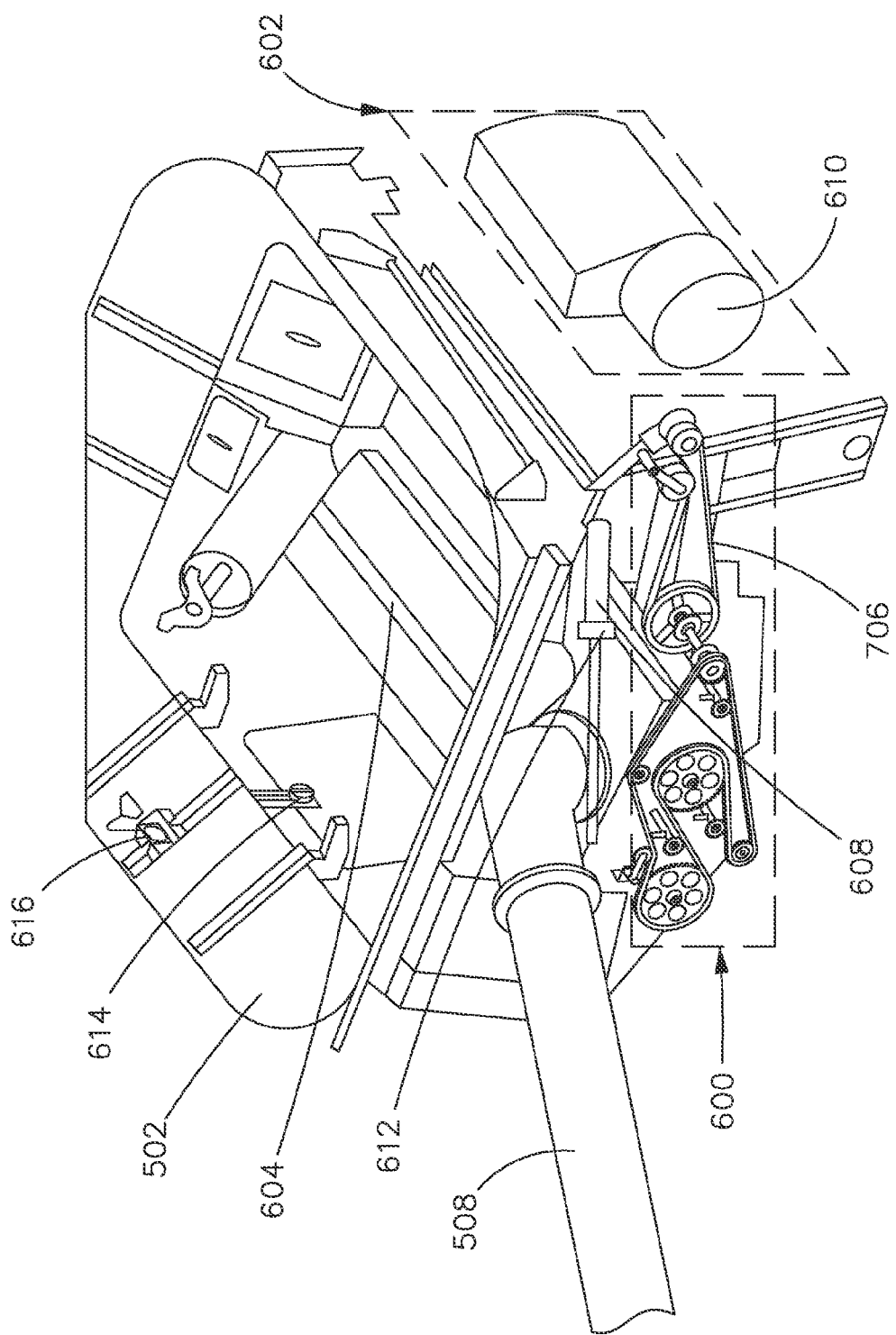
FIG. 6 illustrates an exemplary embodiment of the invention showing a grain tank an unload drive system and a combine engine.

FIG. 6 illustrates an exemplary embodiment of the invention showing a grain tank 502 an unload drive system 600 and a combine engine 602. As shown at FIG. 6, grain tank 502 includes grain tank auger covers 604 covering grain tank augers (not shown). Grain tank 502 may also include at least one grain tank level sensor to determine whether a combine grain tank (or bin) level has reached a predetermined threshold, such as grain tank lower level sensor 614, indicating the level of grain is approaching a predetermined threshold, and grain tank upper level sensor 616, indicating the level of grain has reached a predetermined threshold. Auger covers 604 may be open or closed based on whether a combine grain tank (or bin) level has reached a predetermined threshold. FIG. 6 also shows unload tube 508 for carrying grain from grain tank 502; unload drive system 600 having belt drive 706 and unload chain drive 702; and combine engine 602 coupled to unload drive system 600. The location of combine engine 602 is merely illustrative and is shown for purposes of coupling to unload drive system 600. FIG. 6 also shows unload tube actuator 608 for moving unload tube 508 toward and away from the combine 500.

According to one exemplary embodiment, the control system for a combine unload drive system may include a grain tank, such as grain tank 502, for storing grain, at least one auger, such as augers 332, for unloading grain from the grain tank, and at least one movable auger cover, such as auger covers 604, coupled to the grain tank for controlling the amount of grain to flow into the at least one auger. In some embodiments the control system may include multiple augers, such as the augers 332, shown at FIG. 4. In other embodiments, the control system may include a single auger. In some embodiments the control system may include multiple auger covers, such as the auger covers 604, shown at FIG. 6. In other embodiments, the control system may include a single auger cover.

According to one exemplary embodiment, the control system for a combine unload drive system may include at least one sensor for sensing a force on the unload drive system. For example, sensors 722, 724, 726, shown at FIG. 7, may be used for sensing a force on unload drive system 700.

Figure 7:
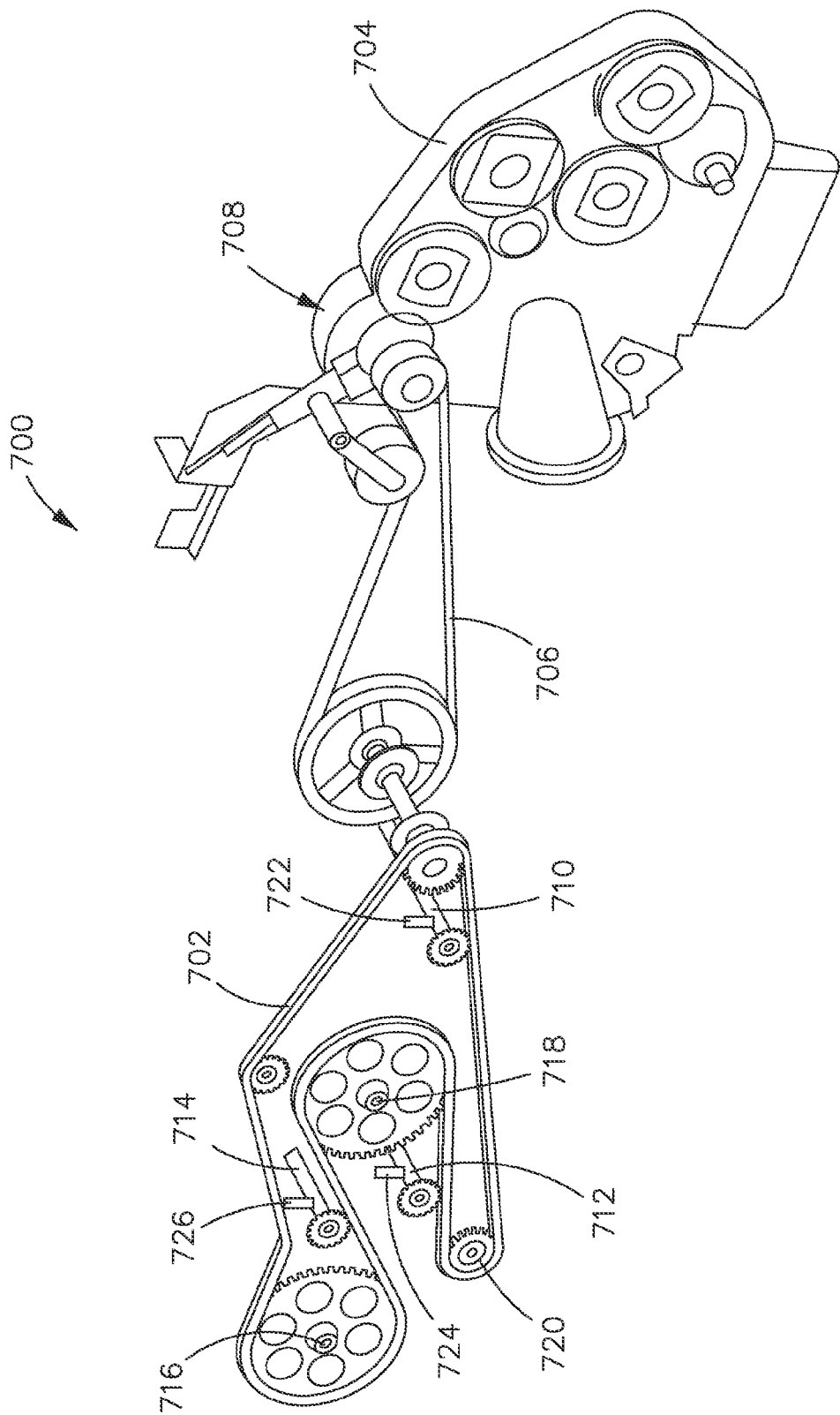
FIG. 7 illustrates an exemplary embodiment of the invention showing an unload drive system.
Figure 8:
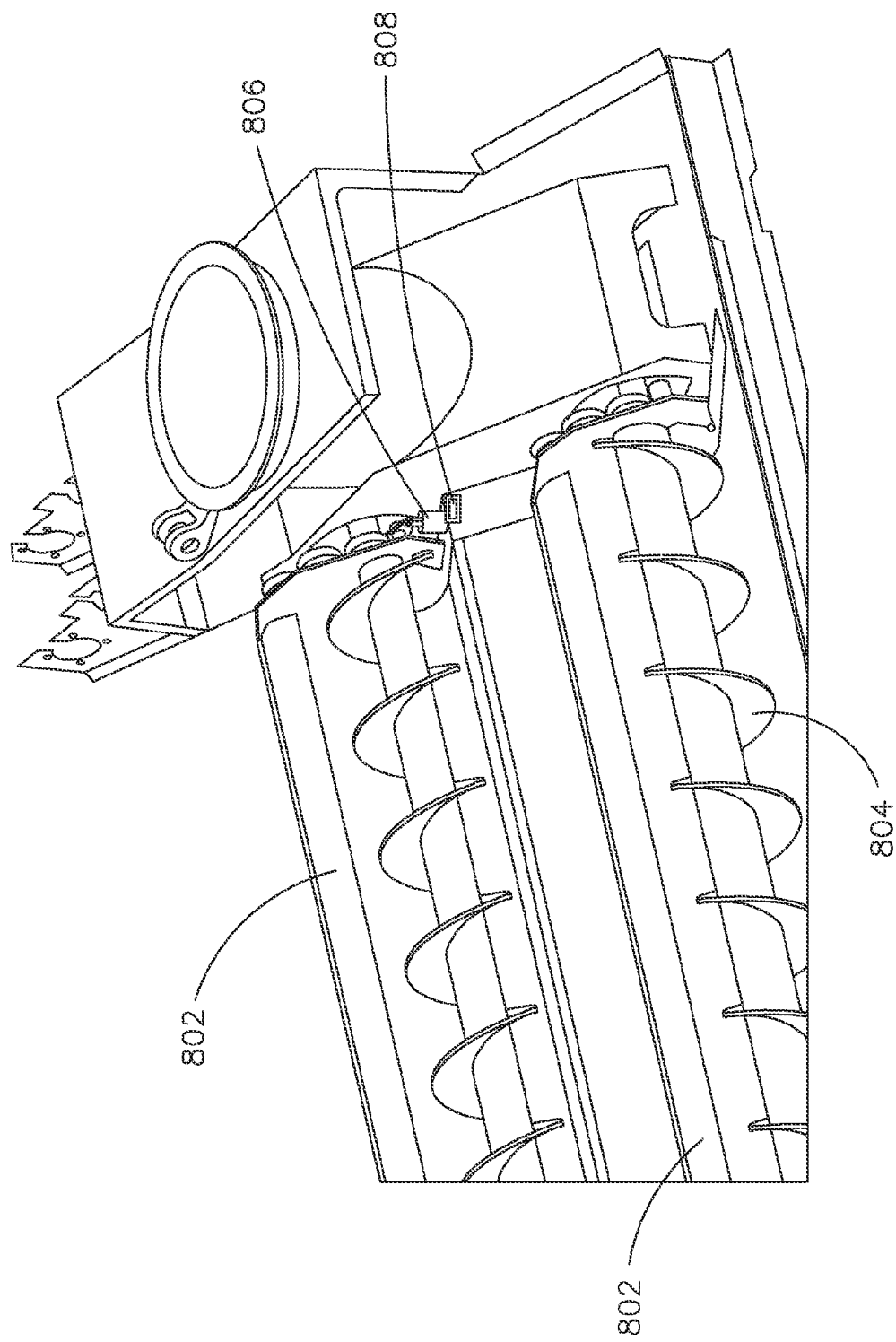
FIG. 8 illustrates an exemplary embodiment of the invention showing a portion of a grain tank having two grain tank augers.

According to an aspect of one exemplary embodiment, an unload drive control system may include an unload chain drive coupled to at least one auger by a sprocket along a first portion of the unload chain drive. Further, the at least one sensor may sense a force on the at least one auger through the sprocket. For example, FIG. 7 illustrates an exemplary embodiment of the invention showing an unload drive system 700 that includes an unload chain drive 702, gear box 704, and belt drive 706 coupled to unload chain drive 702 and gear box 704. Gear box 704 includes hydraulic clutch 708. FIG. 7 shows sprockets 716, 718, 720 coupled to unload chain drive 702. Sprockets 716 and 718 may be coupled to grain tank augers (such as grain tank augers 802 and 804 at FIG. 8). In some embodiments, sprockets may be coupled to grain tank cross augers, such as grain tank cross augers 226 and 228. In other embodiments, sprockets may be coupled to grain tank cross augers configured similar to grain tank augers 332. Sprocket 720 may be coupled to an unload conveying auger, such as unload conveying vertical auger 264, for unloading grain in an unload tube, such as unload tube 508. In some embodiments, a sprocket may be coupled to a horizontal unload conveying auger within an unload tube.

According to another aspect of one exemplary embodiment, unload drive control system may include a load bar having a first end rigidly attached to the grain tank frame and a second end rotatably connected to the unload chain drive and the at least one sensor may be connected to the load bar for sensing the force on the at least one auger through the sprocket. For example, FIG. 7 shows load bars 710, 712, 714 rotatably connected to unloading chain drive 702 at one end. Load bars 710, 712, 714 may also be rigidly attached to the grain tank frame (not shown) at another end. As shown at FIG. 7, sensors 722, 724, 726 are connected to load bars 710, 712, 714 respectively. The sensors may be connected to the load bars in a number of ways, including hardware and adhesive material. In one aspect, the sensors are strain gauges glued to the load bars. It is contemplated that forces on exemplary augers may be sensed by sensors in the vicinity of, embedded in, integral with, adjacent to, locally directed at, or otherwise associated with and in proximity to exemplary load bars.

Figure 10:
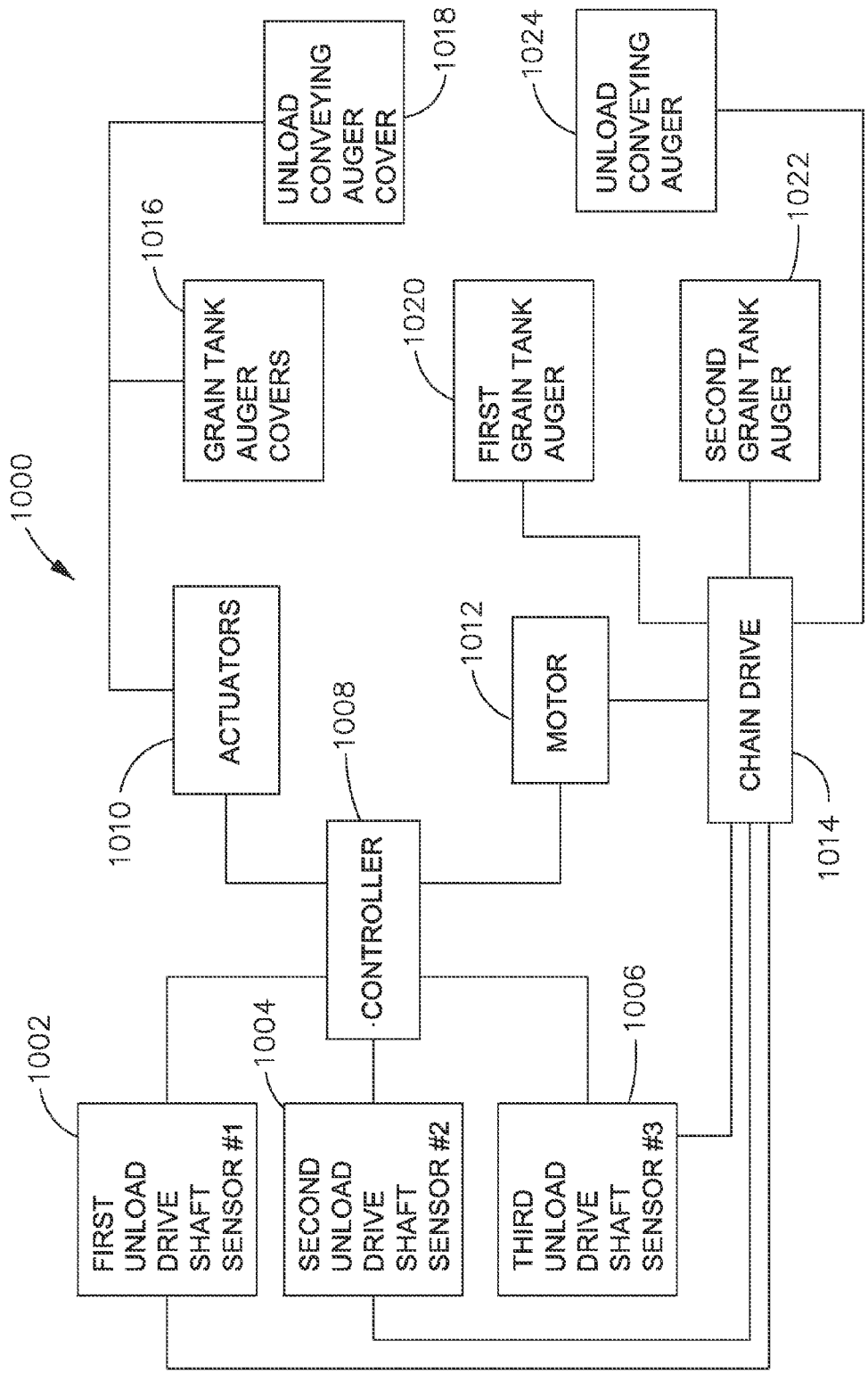
FIG. 10 is a block diagram illustrating an exemplary control system for an unload drive system in accordance with an embodiment of the invention.

According to one exemplary embodiment, an unload drive control system may include a controller for receiving at least one force condition from at least one sensor representing the sensed force on the unload drive system and for causing at least one movable auger cover to move based on the force condition. For example, as shown at FIG. 10, the control system includes first, second and third unload drive shaft sensors 1002, 1004, 1006. It is contemplated that any number of sensors may be used to sense force on the unload drive system. The control system in FIG. 10 also includes controller 1008 and actuators 1010. Actuators may include a grain tank auger cover actuator 806 and a unload tube actuator 608. The control system in FIG. 10 also includes motor 1012, chain drive 1014, grain tank auger covers 1016, unload conveying auger cover 1018, first grain tank auger 1020, second grain tank auger 1022 and unload conveying auger 1024.

An unload drive control system, such as control system 1000, may include a controller, such as controller 1008, for receiving at least one force condition from at least one sensor, such as sensors 1002, 1004, 1006 representing the sensed force on the unload drive system 1000 and for causing at least one movable auger cover, such as auger covers 1016, 1018 to move based on the force condition. The control system may include at least one sensor, such as sensors 722, 724, 726, for sensing an at least one unload condition. The controller may cause the at least one movable auger cover to move based on the at least one unload condition. The unload condition may include at least one of a combine engine torque condition, a grain cart level condition, a combine grain tank level condition, an unload conveyer location condition, a grain cart location condition, an unload drive system operation condition, and a grain cart weight and duration condition.

According to one embodiment, a sensor may sense a force on a first grain tank auger, and the at least one force condition that is received by the controller represents the sensed force on the first grain tank auger. According to another embodiment, the at least one sensor may sense the force on the at least one auger through a sprocket, and the at least one force condition received by the controller represents the sensed force on the at least one auger through the sprocket. For example sensor 726 may be used for sensing the force on an auger through sprocket 716, and the at least one force condition received by a controller, such as controller 1008, may represent the sensed force on the auger through sprocket 716. It is contemplated that any one of the sensors 722, 724, 726 may be used for sensing the force on an auger through any one of the sprockets 716, 718 and 720. It is also contemplated that an unload drive control system may include any number of augers, sprockets and sensors in different configurations.

In one embodiment, an unload drive control system may include a first grain tank auger, a second grain tank auger and a first sensor which senses a first and second grain tank auger force on both the first and second grain tank augers. Further, the at least one force condition received by the controller represents the sensed force on both the first and second grain tank augers. In another embodiment, the unload drive control system may include an unload chain drive coupled to the first grain tank auger by a first sprocket along a first portion of the unload chain drive and coupled to the second grain tank auger by a second sprocket along a second portion of the unload chain drive. Further, the first sensor may sense a first and second grain tank auger force on the first grain tank auger through the first sprocket and the second grain tank auger through the second sprocket and the at least one force condition received by the controller may represent the combined sensed force on the first grain tank auger through the first sprocket and second grain tank auger through the second sprocket. For example, unload chain drive 702, shown at FIG. 7, may be coupled to a first grain tank auger (not shown) by the first sprocket 716 along a first portion of the unload chain drive 702 and coupled to the second grain tank auger (not shown) by a second sprocket 718 along a second portion of the unload chain drive 702. A first sensor 724 may sense a first and second grain tank auger force on the first grain tank auger through the first sprocket 716 and the second grain tank auger through the second sprocket 718 and the at least one force condition received by a controller, such as controller 1008, may represent the combined sensed force on the first grain tank auger through the first sprocket 716 and second grain tank auger through the second sprocket 718.

According to one embodiment, an unload drive control system may also include an unload conveying auger for conveying grain from the first and second grain tank augers through an unload conveyer. The first sensor may sense a combined force on the first grain tank auger, the second grain tank auger and the unload conveying auger, and the at least one force condition received by the controller may represent the combined sensed force on the first grain tank auger, the second grain tank auger and the unload conveying auger. According to an aspect of one embodiment that includes the unload chain drive 702, the first sensor may sense a combined force on the first grain tank auger through the first sprocket, the second grain tank auger through the second sprocket, and the unload conveying auger through a third sprocket. The at least one force condition received by the controller represents the combined sensed force on the first grain tank auger through the first sprocket, the second grain tank auger through the second sprocket, and the unload conveying auger through the third sprocket. For example, as shown at FIG. 7, unload chain drive 702 may also be coupled to an unload conveying auger, such as vertical conveying auger 264, through a third sprocket 720. The at least one force condition received by a controller, such as controller 1008 may represent the combined sensed force on the first grain tank auger through the first sprocket 716, the second grain tank auger through the second sprocket 718, and the unload conveying auger through the third sprocket 720.

In one embodiment, an unload drive control system may include a first sensor which senses a first and second grain tank auger force on both the first and second grain tank augers, and the at least one force condition received by the controller represents the sensed force on both the first and second grain tank augers. The unload drive control system may also include a second sensor for sensing a combined force on the first grain tank auger, the second grain tank auger and the unload conveying auger. Further, the at least one force condition received by the controller may include a first and second grain tank auger force condition representing the combined sensed force on the first and second grain tank augers and a combined force condition on the first grain tank auger, the second grain tank auger and the unload conveying auger. In an aspect of an embodiment that includes the unload chain drive 702, the at least one force condition received by the controller may include (i) a first and second grain tank auger force condition representing the combined sensed force on the first grain tank auger through the first sprocket and second grain tank auger through the second sprocket and (ii) a combined force condition representing the combined sensed force on the first grain tank auger through the first sprocket, the second grain tank auger through the second sprocket and an unload conveying auger through the third sprocket. For example, as shown at FIG. 7, the at least one force condition received by a controller, such as controller 1008, may include a first and second grain tank auger force condition representing the combined sensed force, from sensor 724, on the first grain tank auger through the first sprocket 716 and second grain tank auger through the second sprocket 718. The at least one force condition may also include a combined force condition representing the combined sensed force on the first grain tank auger through the first sprocket 716, the second grain tank auger through the second sprocket 718 and an unload conveying auger through the third sprocket 720. A force on the unload conveying auger through the third sprocket 720 may be calculated by subtracting the first and second grain tank auger force from the combined sensed force on the first grain tank auger, the second grain tank auger and the unload conveying auger.

According to another embodiment, an unload drive control system may include a first sensor for sensing a first force on the first grain tank auger, the second grain tank auger and the unload conveying auger, a second sensor for sensing a second force on both the first grain tank auger and the second grain tank auger, and a third sensor for sensing a third force on one of the first and second grain tank augers. The at least one force condition received by the controller may include a first force condition representing the sensed first force, a second force condition representing the sensed second force, and a third force condition representing the sensed third force. In an aspect of an embodiment that includes the unload chain drive 702, the first sensor may sense the first force on the first grain tank auger through the first sprocket, the second grain tank auger through the second sprocket and the unload conveying auger through the third sprocket. The second sensor may sense the second force on both the first grain tank auger through the first sprocket and the second grain tank auger through the second sprocket. The third sensor may sense the third force on the first grain tank auger through the first sprocket. The at least one force condition received by the controller may include a first force condition representing the sensed first force, a second force condition representing the sensed second force, and a third force condition representing the sensed third force. For example, as shown at FIG. 7, the first sensor 722 may sense the first force on the first grain tank auger through the first sprocket 716, the second grain tank auger through the second sprocket 718 and the unload conveying auger through the third sprocket 720. The second sensor 724 may sense the second force on both the first grain tank auger through the first sprocket 716 and the second grain tank auger through the second sprocket 718. The third sensor 722 may sense the third force on the first grain tank auger through the first sprocket 716. The at least one force condition received by a controller, such as controller 1008, may include a first force condition representing the sensed first force, a second force condition representing the sensed second force; and a third force condition representing the sensed third force.

Figure 9B:
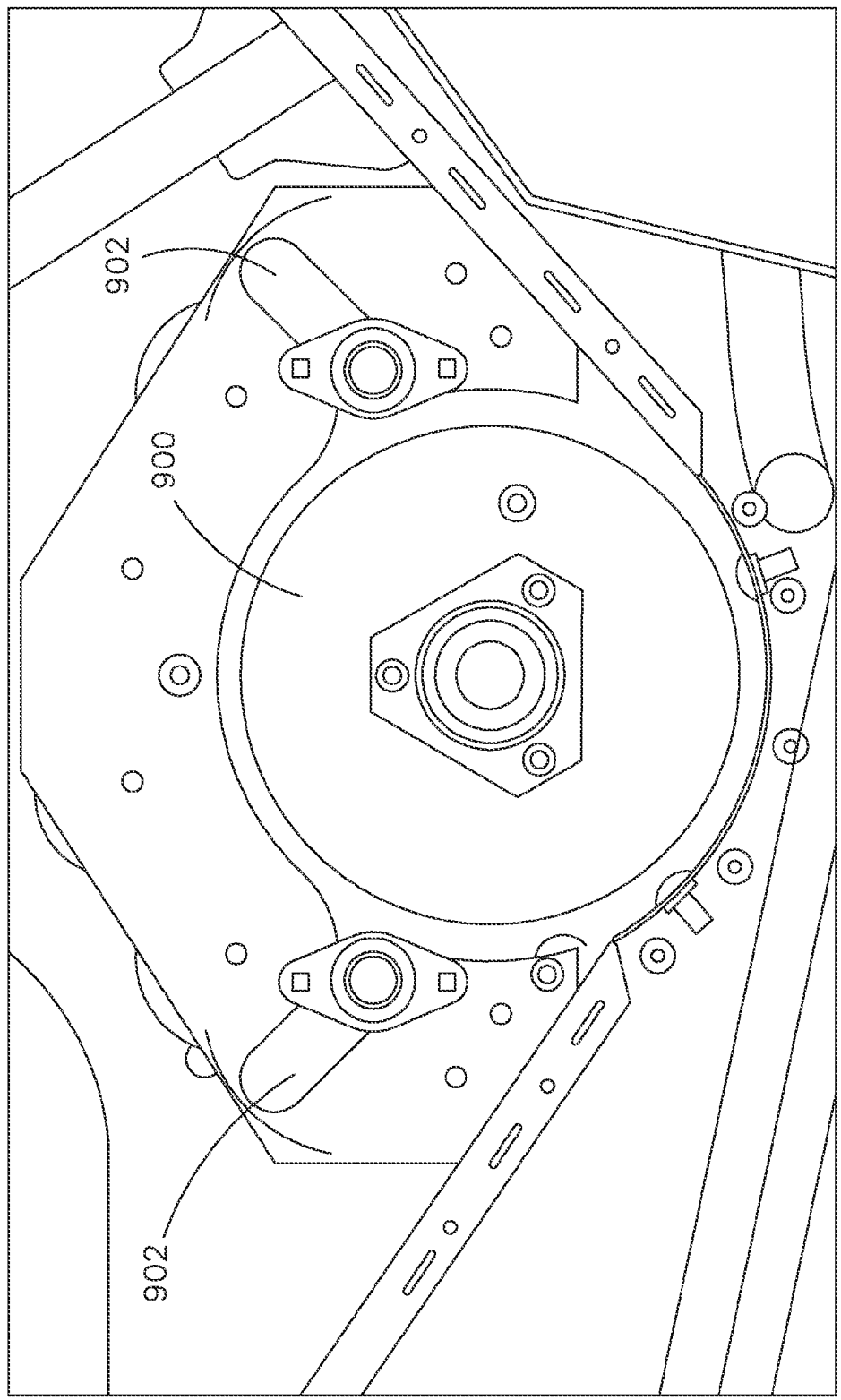
Figure 9C:
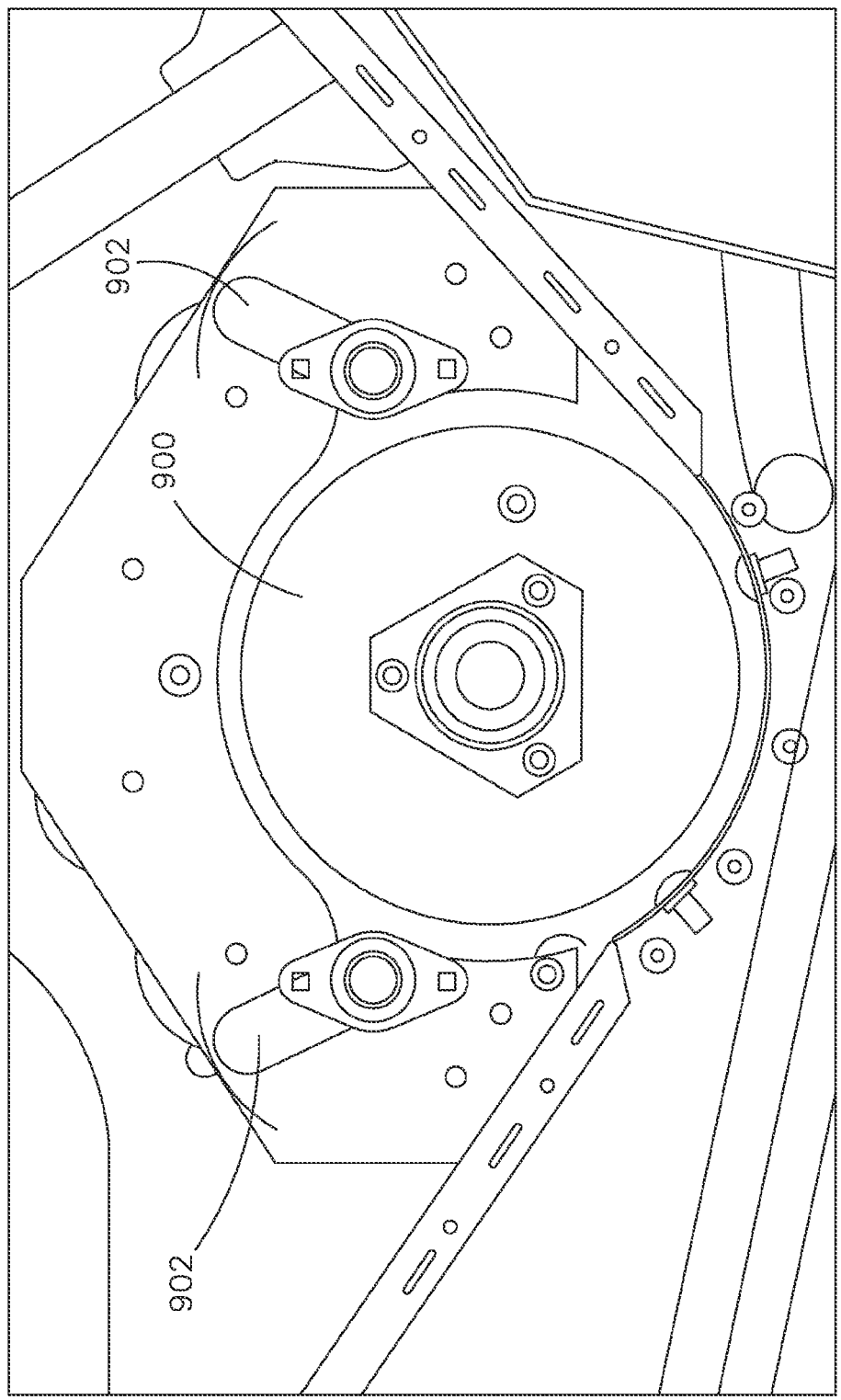

FIG. 9A, FIG. 9B and FIG. 9C illustrate an exemplary embodiment of the invention showing grain tank auger covers at closed, half open and fully open stages, respectively. FIG. 9A shows grain tank auger covers 902 fully closed. FIG. 9B shows grain tank auger covers 902 half open. FIG. 9C shows grain tank auger covers 902 fully open. As shown at FIG. 9A through 9C, movable auger covers 902 includes an end pivotably mounted to auger 900. In one embodiment, a controller may cause at least one movable auger cover to move if the force condition representing the sensed force on the grain tank auger exceeds a predetermined force threshold. For example, controller 1008 may cause movable auger covers 902 to move from fully open positions to fully closed positions if the force condition representing the sensed force on the grain tank auger exceeds a predetermined force threshold. Controller 1008 may include a comparator (not shown) for comparing a force condition to a predetermined force threshold. It is also contemplated that an unload drive control system may include a comparator separate from a controller.

Controller 1008 may also cause movable auger covers 902 to move to positions between fully open positions and fully closed positions, including the half open positions shown at FIG. 9B based on the sensed force condition of the auger. Controller 1008 may also cause movable auger covers 902 to move to positions between fully open positions and fully closed positions, including the half open positions shown at FIG. 9B based on the conditions sensed from an auger covers position sensor, such as auger covers position sensor 808, shown at FIG. 8.

An unload drive control system may include other augers having movable auger covers. A controller may cause other movable auger covers to move if one of the at least one force conditions exceeds a predetermined force threshold. For example, controller 1008 may cause the other movable auger covers to move between open and closed positions. It is contemplated that controller 1008 may cause the auger covers of one auger or the auger covers of more than one auger to move between open and closed positions. It is also contemplated that controller 1008 may cause one movable auger cover of an auger to move between open and closed positions independent from a second auger cover of the auger.

Figure 11:
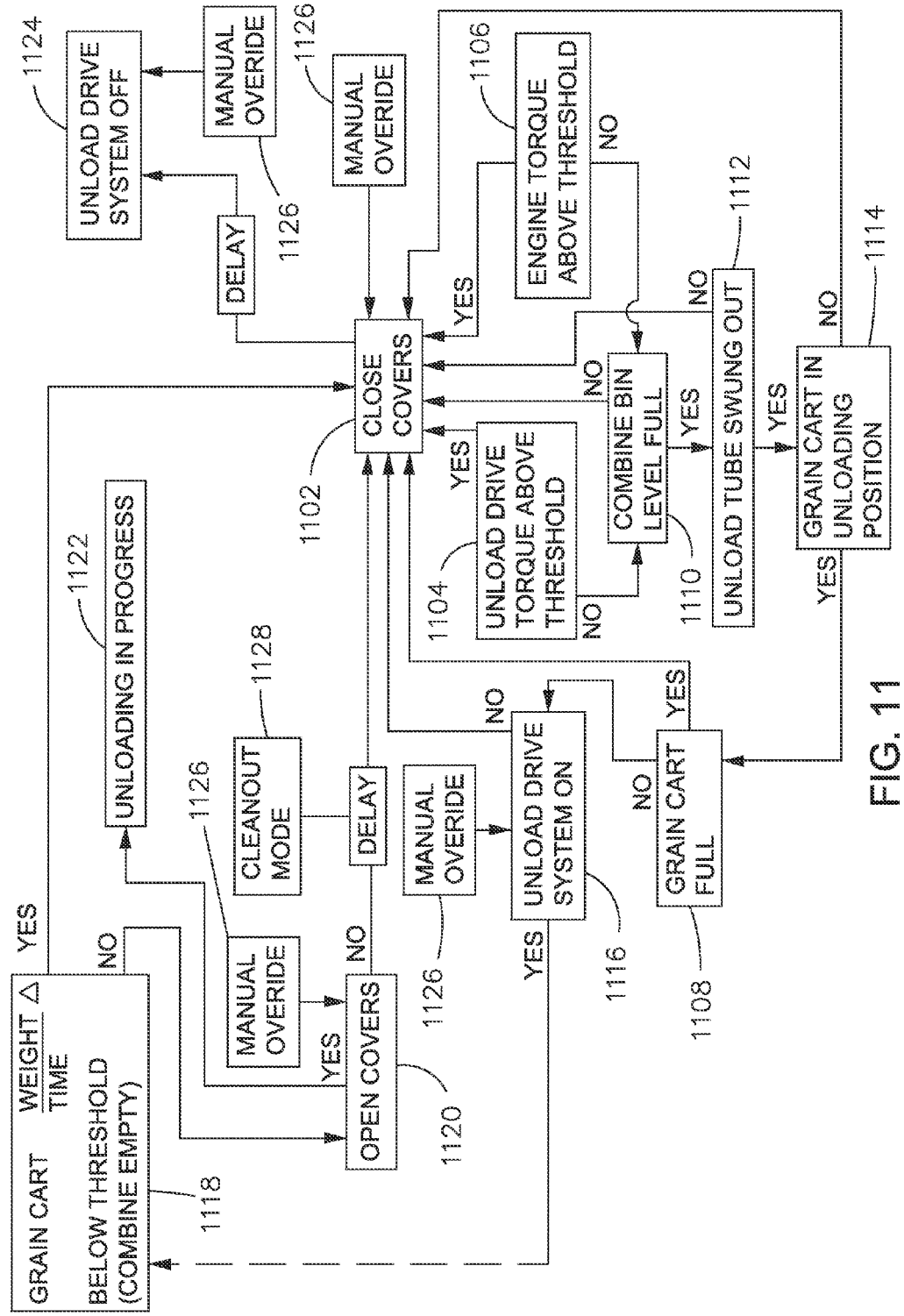
FIG. 11 is a logic flow diagram illustrating a logic method of controlling force on an unload drive system in accordance with an embodiment of the invention.

FIG. 11 is a logic flow diagram illustrating a logic method of controlling force on an unload drive system in accordance with an embodiment of the invention. As shown at FIG. 11, auger covers may be closed based on a number of conditions. In some embodiments, a controller may cause an auger cover to be closed 1102 based on the conditions on the unload drive system. For example, auger covers may be open 1120 or closed 1102 based on whether the unload drive torque (such as the force on grain tank and unload conveying augers) is above a predetermined threshold 1104. The unload drive torque may be sensed, for example, by sensors 722, 724, 726. Auger covers may be open 1120 or closed 1102 based on an operation condition, such as whether the unload drive system is on 1116 or off 1124.

In other embodiments, a controller may cause an auger cover to be closed 1102 based on other unload conditions, such as a combine engine torque condition, a grain cart level condition, a combine grain tank level condition, an unload conveyer location condition, a grain cart location condition, an unload drive system operation condition, and a grain cart weight and duration condition. For example, auger covers may be open 1120 or closed 1102 based on whether the engine torque is above a predetermined threshold 1106. The engine torque may be sensed, for example, by sensor 610. Auger covers may be open 1120 or closed 1102 based on whether a bin level in a grain cart, such as grain cart 510, has reached a predetermined threshold (e.g. grain cart is full) 1108. The grain level of a grain cart may be sensed, for example, by grain cart bin level sensor 512. Auger covers may be open 1120 or closed 1102 based on whether a combine grain tank (or bin) level has reached a predetermined threshold 1110.

Auger covers may be open 1120 or closed 1102 based on whether an unloading tube, such as unloading tube 508, has swung out or moved to a predetermined position 1112. The position of an unloading tube may be determined, for example, by unload position sensor 612. Auger covers may be open 1120 or closed 1102 based on whether a grain cart, such as grain cart 510, is in an unloading position or moved to a predetermined position 1114. The position of a grain cart may be determined, for example, by a GPS receiver/transmitter 514, which may be located on the grain cart or tractor moving the grain cart. Auger covers may be open 1120 or closed 1102 based on a grain cart weight and duration condition, such as whether the grain cart weight has reached a predetermined threshold for a predetermined time period 1118. A grain cart weight/time sensor may be placed in the vicinity of, embedded in, integral with, adjacent to, locally directed at, or otherwise associated with and in proximity to the grain cart. Auger covers may also be open 1120 or closed 1102 based on whether unloading of grain is still in progress 1122, whether a manual override has been initiated 1126, and whether the unload system is in a cleanout mode 1128.

Figure 12:
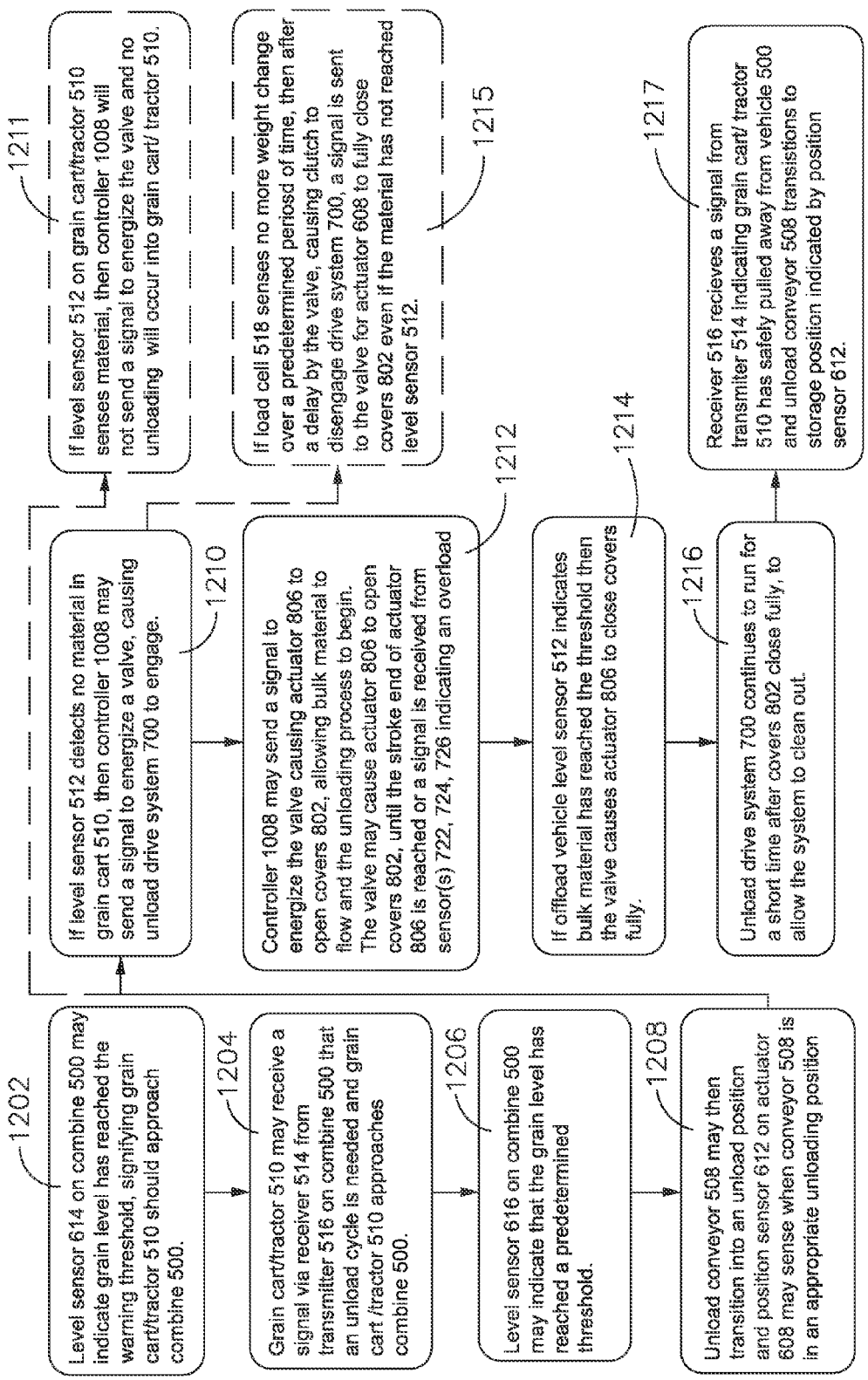
FIG. 12 is a flow chart illustrating an exemplary method of controlling a force on an unload drive system in accordance with an embodiment of the invention.

FIG. 12 is a flow chart illustrating an exemplary method of controlling a force on an unload drive system in accordance with an embodiment of the invention. At step 1202, level sensor 614 on combine 500 may indicate grain level has reached the warning threshold, signifying grain cart/tractor 510 should approach combine 500. At step 1204, grain cart/tractor 510 may receive a signal via receiver 514 from transmitter 516 on combine 500 that an unload cycle is needed and grain cart /tractor 510 approaches combine 500. As step 1206, level sensor 616 on combine 500 may indicate that the grain level has reached a predetermined threshold. Unload conveyor 508 may then transition into an unload position and position sensor 612 on actuator 608 may sense when conveyor 508 is in an appropriate unloading position, as shown at step 1208.

At step 1210, if level sensor 512 detects no material in grain cart 510, then controller 1008 may send a signal to energize a valve (not shown), causing unload drive system 700 to engage. Alternatively, as shown at step 1211, if level sensor 512 on grain cart/tractor 510 senses material, then controller 1008 will not send a signal to energize valve and no unloading will occur into grain cart/ tractor 510.

At step 1212, controller 1008 may send a signal to energize the valve causing actuator 806 to open covers 802, allowing bulk material to flow and the unloading process to begin. The valve may cause actuator 806 to open covers 802, until the stroke end of actuator 806 is reached or a signal is received from sensor(s) 722, 724, 726 indicating an overload. Alternatively, as shown at step 1215, if load cell 518 senses no more weight change over a predetermined period of time, then after a delay by the valve, causing clutch to disengage drive system 700, a signal may be sent to the valve for actuator 608 to fully close covers 802 even if the material has not reached level sensor 512.

At step 1214, if offload vehicle level sensor 512 indicates bulk material has reached the threshold, the valve causes actuator 806 to close covers fully. At step 1214, unload drive system 700 may continue to run for a short time after covers 802 close fully, to allow the system to clean out. Receiver 516 may receive a signal from transmitter 514 indicating grain cart/tractor 510 has safely pulled away from vehicle 500 and unload conveyor 508 transitions to a storage position indicated by position sensor 612.

Figure 13:
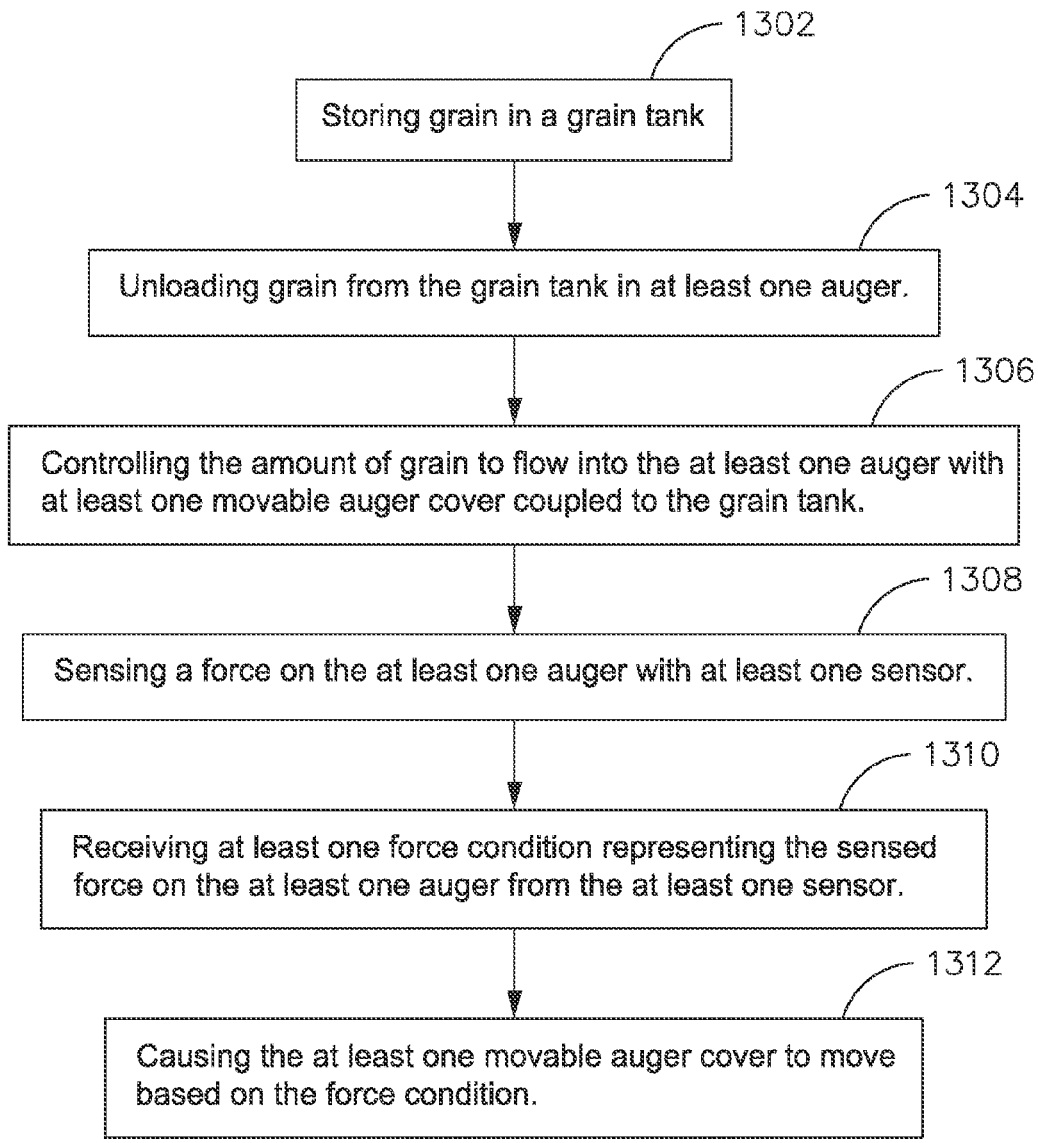
FIG. 13 is a flow chart illustrating another exemplary method of controlling a force on an unload drive system in accordance with an embodiment of the invention.

FIG. 13 is a flow chart illustrating another exemplary method of controlling a force on an unload drive system in accordance with an embodiment of the invention. As shown at step 1302, the method includes storing grain in a grain tank. For example, grain may be stored in grain tank 502. As shown at step 1304, the method includes unloading grain from the grain tank in at least one auger. For example, grain may be unloaded from grain tank in augers such as grain tank augers 802 and 804 grain tank cross augers 226 and 228, and unload conveying vertical auger 264 for unloading grain in an unload tube, such as unload tube 508.

As shown at step 1306, the method includes controlling the amount of grain to flow into the at least one auger with at least one movable auger cover coupled to the grain tank. For example, auger covers 902 may be used for controlling the amount of grain to flow into auger 900.

As shown at step 1308, the method includes sensing a force on the at least one auger with at least one sensor. For example, sensors 722, 724 and 726 may be used for sensing a force on grain tank augers 802 and 804 grain tank cross augers 226 and 228, and unload conveying vertical auger 264 for unloading grain in an unload tube, such as unload tube 508. Sensors 722, 724 and 726 may also be used for sensing a force on at least one auger, such as grain tank augers 802 and 804 grain tank cross augers 226 and 228, through a sprocket, such as sprockets 716, 718 and 720, which are coupled to unload chain drive 700.

As shown at step 1310, the method includes receiving at least one force condition representing the sensed force on the at least one auger from the at least one sensor. For example, controller 1008 may receive at least one force condition representing the sensed force on augers, such as augers 226, 228, and 264 from sensors 722, 724 and 726.

As shown at step 1312, the method includes causing the at least one movable auger cover to move based on the force condition. For example, controller 1008 may cause the at least one movable auger cover, such as covers 902 to move based on the force condition. This may also include moving cover 902 if the force condition exceeds a predetermined force threshold.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine unload drive control system comprising:
    a grain tank for storing grain;
    at least one auger for unloading grain from the grain tank;
    at least one movable auger cover coupled to the grain tank for controlling the amount of grain to flow into the at least one auger;
    at least one sensor for sensing a force on the at least one auger; and
    a controller for:
        (i) receiving at least one force condition from the at least one sensor representing the sensed force on the at least one auger; and
        (ii) causing the at least one movable auger cover to move based on the received at least one force condition.

2. The unload drive control system of claim 1, further comprising an unload chain drive coupled to the at least one auger by a sprocket along a first portion of the unload chain drive, wherein the at least one sensor senses a force on the at least one auger through the sprocket, and the at least one force condition received by the controller represents the sensed force on the at least one auger through the sprocket.

3. The unload drive control system of claim 2, further comprising a load bar having a first end rigidly attached to a grain tank frame and a second end rotatably connected to the unload chain drive, wherein the at least one sensor is connected to the load bar for sensing the force on the at least one auger through the sprocket.

4. The unload drive control system of claim 1, wherein, the at least one auger comprises a first grain tank auger and a second grain tank auger;
    the control system further comprises an unload chain drive coupled to: (i) the first grain tank auger by a first sprocket along a first portion of the unload chain drive; and (ii) the second grain tank auger by a second sprocket along a second portion of the unload chain drive;
    the at least one sensor comprises a first sensor which senses a first and second grain tank auger force on the first grain tank auger through the first sprocket and the second grain tank auger through the second sprocket; and
    the at least one force condition received by the controller represents the combined sensed force on the first grain tank auger through the first sprocket and second grain tank auger through the second sprocket.

5. The unload drive control system of claim 4, wherein the at least one auger further comprises an unload conveying auger for conveying the grain from the first and second grain tank augers through an unload conveyer;
    the first sensor senses a combined force on the first grain tank auger through the first sprocket, the second grain tank auger through the second sprocket, and the unload conveying auger through a third sprocket; and
    the at least one force condition received by the controller represents the combined sensed force on the first grain tank auger through the first sprocket, the second grain tank auger through the second sprocket, and the unload conveying auger through the third sprocket.

6. The unload drive control system of claim 4, wherein the at least one auger further comprises: an unload conveying auger for conveying the grain from the first and second grain tank augers through an unload conveyer;
    the at least one sensor further comprises a second sensor for sensing a combined force on the first grain tank auger through the first sprocket, the second grain tank auger through the second sprocket and an unload conveying auger through the third sprocket; and
    the at least one force condition received by the controller comprises: (i) a first and second grain tank auger force condition representing the combined sensed force on the first grain tank auger through the first sprocket and second grain tank auger through the second sprocket and (ii) a combined force condition representing the combined sensed force on the first grain tank auger through the first sprocket, the second grain tank auger through the second sprocket and an unload conveying auger through the third sprocket.

7. The unload drive control system of claim 1, wherein the at least one auger comprises a first grain tank auger and a second grain tank auger;
    the unload drive control system further comprises:
        an unload conveying auger for conveying the grain from the first and second grain tank augers through an unload conveyer;
        an unload chain drive coupled to: (i) the first grain tank auger by a first sprocket along a first portion of the unload chain drive; (ii) the second grain tank auger by a second sprocket along a second portion of the unload chain drive;
    and (iii) the unload conveying auger by a third sprocket along a third portion of the unload chain drive;
    the at least one sensor comprises;

a first sensor for sensing a first force on the first grain tank auger through the first sprocket, the second grain tank auger through the second sprocket and the unload conveying auger through the third sprocket;

a second sensor for sensing a second force on both the first grain tank auger through the first sprocket and the second grain tank auger through the second sprocket; and a third sensor for sensing a third force on the first grain tank auger through the first sprocket; and wherein, the at least one force condition received by the controller comprises: a first force condition representing the sensed first force; a second force condition representing the sensed second force; and a third force condition representing the sensed third force.

8. A control system for a combine unload drive system, the control system comprising:

a grain tank for storing grain;

at least one auger for unloading grain from the grain tank;

at least one movable auger cover coupled to the grain tank for controlling the amount of grain to flow into the at least one auger;

at least one sensor for sensing a force on the unload drive system;

a controller for: (i) receiving at least one force condition from the at least one sensor representing the sensed force on the unload drive system; and (ii) causing the at least one movable auger cover to move based on the at least one force condition.

9. The control system of claim 8, wherein the at least one auger comprises a first grain tank auger, the at least one sensor senses a force on the first grain tank auger, and the at least one force condition received by the controller represents the sensed force on the first grain tank auger.

10. The control system of claim 9, wherein the controller causes one of the at least one movable auger covers to move if the at least one force condition representing the sensed force on the first grain tank auger exceeds a predetermined force threshold.

11. The control system of claim 8, wherein the at least one auger comprises: a first grain tank auger and a second grain tank auger;

the at least one sensor comprises a first sensor which senses a first and second grain tank auger force on both the first and second grain tank augers; and the at least one force condition received by the controller represents the sensed force on both the first and second grain tank augers.

12. The control system of claim 11, wherein the at least one auger further comprises: an unload conveying auger for conveying the grain from the first and second grain tank augers through an unload conveyer;

the first sensor senses a combined force on the first grain tank auger, the second grain tank auger and the unload conveying auger, and the at least one force condition received by the controller represents the combined sensed force on the first grain tank auger, the second grain tank auger and the unload conveying auger.

13. The control system of claim 11, wherein the at least one auger further comprises: an unload conveying auger for conveying the grain from the first and second grain tank augers through an unload conveyer;

the at least one sensor further comprises: a second sensor for sensing a combined force on the first grain tank auger, the second grain tank auger and the unload conveying auger;

and the at least one force condition received by the controller comprises: (i) a first and second grain tank auger force condition representing the combined sensed force on the first and second grain tank augers; and (ii) a combined force condition on the first grain tank auger, the second grain tank auger and the unload conveying auger.

14. The control system of claim 8, wherein the at least one auger comprises:

a first grain tank auger, a second grain tank auger, and an unload conveying auger for conveying the grain from the first and second grain tank augers through an unload conveyer; and the at least one sensor comprises:

a first sensor for sensing a first force on the first grain tank auger, the second grain tank auger and the unload conveying auger;

a second sensor for sensing a second force on both the first grain tank auger and the second grain tank auger; and a third sensor for sensing a third force on one of the first and second grain tank augers;

wherein, the at least one force condition received by the controller comprises a first force condition representing the sensed first force; a second force condition representing the sensed second force; and a third force condition representing the sensed third force.

15. The control system of claim 14, wherein the controller causes one of the at least one movable auger covers to move if at least one of the at least one force conditions exceed a predetermined force threshold.

16. The control system of claim 8, wherein the at least one movable auger cover comprises an end pivotably mounted to the at least one auger.

17. The control system of claim 8, further comprising at least one other sensor for sensing an unload condition, the unload condition comprising: at least one of a combine engine torque condition, a grain cart level condition, a combine grain tank level condition, an unload conveyer location condition, a grain cart location condition, an unload drive system operation condition, and a grain cart weight and duration condition, wherein the controller causes the at least one movable auger cover to move based on the at least one unload condition.

18. A method for controlling an unload drive system in a combine comprising:

storing grain in a grain tank;

unloading grain from the grain tank in at least one auger;

controlling the amount of grain to flow into the at least one auger with at least one movable auger cover coupled to the grain tank;

sensing a force on the at least one auger with at least one sensor;

receiving at least one force condition representing the sensed force on the at least one auger from the at least one sensor; and causing the at least one movable auger cover to move based on the at least one force condition.

19. The method of claim 18, wherein sensing a force on the at least one auger comprises sensing a force on the at least one auger through a sprocket coupled to an unload chain drive.

20. The method of claim 18, wherein causing the at least one movable auger cover to move based on the force condition comprises causing the at least one movable auger cover to move if the force condition exceeds a predetermined force threshold.

* * * * *